(12) United States Patent
Regard

(10) Patent No.: US 11,790,011 B2
(45) Date of Patent: Oct. 17, 2023

(54) SYSTEM AND METHOD OF DATA TRANSFORMATION

(71) Applicant: iDiscovery Solutions, Inc., Washington, DC (US)

(72) Inventor: Daniel Regard, Washington, DC (US)

(73) Assignee: XIOT, LLC, Washington, DC (US)

( * ) Notice: Subject to any disclaimer, the term of this patent is extended or adjusted under 35 U.S.C. 154(b) by 37 days.

(21) Appl. No.: 17/329,000

(22) Filed: May 24, 2021

(65) Prior Publication Data

US 2022/0083598 A1     Mar. 17, 2022

Related U.S. Application Data

(63) Continuation of application No. 16/597,549, filed on Oct. 9, 2019, now Pat. No. 11,017,031.

(60) Provisional application No. 62/743,478, filed on Oct. 9, 2018.

(51) Int. Cl.
    *G06F 16/906*      (2019.01)
    *G06F 16/9035*      (2019.01)
    *G06F 16/25*      (2019.01)
    *G06F 16/22*      (2019.01)

(52) U.S. Cl.
CPC .......... *G06F 16/906* (2019.01); *G06F 16/221* (2019.01); *G06F 16/258* (2019.01); *G06F 16/9035* (2019.01)

(58) Field of Classification Search
CPC .. G06F 16/906; G06F 16/9035; G06F 16/258; G06F 16/221
USPC ....................................................... 707/737
See application file for complete search history.

(56) References Cited

U.S. PATENT DOCUMENTS

| | | | |
|---|---|---|---|
| 6,629,097 B1 | 9/2003 | Keith | |
| 6,766,326 B1 | 7/2004 | Cena | |
| 7,634,492 B2 | 12/2009 | Parker et al. | |
| 9,105,000 B1 | 8/2015 | White et al. | |
| 9,194,955 B1 * | 11/2015 | Fahrner | G01S 19/16 |
| 9,607,056 B2 | 3/2017 | Martin, Jr. et al. | |
| 10,248,120 B1 * | 4/2019 | Siegel | G05D 1/0088 |
| 10,394,966 B2 * | 8/2019 | Ghafourifar | G06F 16/337 |

(Continued)

FOREIGN PATENT DOCUMENTS

KR      1020060095447 A      8/2006

OTHER PUBLICATIONS

Toole, Jameson L., et al., "The path most traveled: Travel demand estimation using big data resources", Transportation Research Part C, vol. 58, Part B, Sep. 2015, pp. 162-177.*

(Continued)

*Primary Examiner* — Robert Stevens
(74) *Attorney, Agent, or Firm* — Womble Bond Dickinson (US) LLP

(57) ABSTRACT

A method and apparatus of a device that transforms data is described. In an exemplary embodiment, the device receives data from the plurality of data sources, wherein the plurality of data sources has different data formats. In addition, for each of the plurality of data sources, the device selects a first set of columns for transformation for that data source and expands the selected first set of columns into a set of rows, wherein each of the rows has an identical data format. Furthermore, the device combines the plurality of sets of rows having an identical data format into a transformed data set.

20 Claims, 8 Drawing Sheets

(56) References Cited

U.S. PATENT DOCUMENTS

| | | | | |
|---|---|---|---|---|
| 2004/0218894 | A1* | 11/2004 | Harville | G06F 16/29 |
| | | | | 386/241 |
| 2008/0125964 | A1* | 5/2008 | Carani | G08G 1/127 |
| | | | | 701/408 |
| 2009/0005987 | A1* | 1/2009 | Vengroff | G06Q 30/02 |
| | | | | 705/7.34 |
| 2009/0324211 | A1* | 12/2009 | Strandell | G01S 5/0045 |
| | | | | 455/456.1 |
| 2014/0046931 | A1 | 2/2014 | Mok et al. | |
| 2014/0274131 | A1* | 9/2014 | Zhang | G01S 5/0018 |
| | | | | 455/456.2 |
| 2014/0368601 | A1* | 12/2014 | deCharms | H04N 7/148 |
| | | | | 348/14.02 |
| 2014/0372171 | A1* | 12/2014 | Martin, Jr. | G06Q 30/0201 |
| | | | | 705/7.29 |
| 2015/0026154 | A1 | 1/2015 | Jeong et al. | |
| 2015/0324346 | A1 | 11/2015 | Sankaran et al. | |
| 2015/0356289 | A1* | 12/2015 | Brown | G06F 21/35 |
| | | | | 726/7 |
| 2016/0259043 | A1* | 9/2016 | Schär | G01S 13/87 |
| 2017/0169041 | A1* | 6/2017 | Vijayvergiya | H04W 4/029 |
| 2018/0075115 | A1 | 3/2018 | Murray et al. | |
| 2018/0181630 | A1* | 6/2018 | He | G06F 16/9024 |
| 2018/0210899 | A1* | 7/2018 | Cosic | G06F 16/21 |
| 2018/0329511 | A1* | 11/2018 | Aman | G06F 3/0308 |
| 2019/0102196 | A1 | 4/2019 | Sade et al. | |
| 2019/0252059 | A1* | 8/2019 | Gleason | G06N 5/048 |
| 2020/0097726 | A1* | 3/2020 | Gurule | G06V 20/20 |
| 2020/0242111 | A1* | 7/2020 | Oberbreckling | G06F 16/221 |

OTHER PUBLICATIONS

Blakeley, Jose A., "Universal Data Access with OLE DB", CMPCOM 1997, San Jose, CA, Feb. 23-26, 1997, pp. 2-7.

PCT Notification of Transmittal of the International Search Report and the Written Opinion of the International Searching Authority, or the Declaration for PCT Counterpart Application No. PCT/US2019/055419 Containing International Search Report, 11 pgs. (dated Feb. 14, 2020).

* cited by examiner

SYSTEM AND METHOD OF DATA TRANSFORMATION

This application is a continuation of U.S. patent application Ser. No. 16/597,549, filed Oct. 9, 2019, which claims the benefit of priority of U.S. Provisional Patent Application No. 62/743,478, filed on Oct. 9, 2018, the disclosure of which are incorporated by reference in its entirety.

FIELD OF INVENTION

This invention relates generally to data transformation and specifically to transforming disparate data sources into a universal format.

BACKGROUND OF THE INVENTION

An analyst may want to perform an analysis over disparate data sources as the disparate data sources will frequently cover different scopes of data. For example, the analyst may want to correlate movement of drivers with delivery and invoice data along with global positioning data and tablet activity data. Each of the disparate data sources can include different data, be in different formats, including data schemas that are quite different. The disparate data sources can include things such as badge swipe data, electronic communication records (email, chats, text messages, etc.), phone records (landline, private branch exchange (PBX) voice over IP (VOIP), and/or mobile phone records), Human Resource Information Systems (HRIS) including payroll and employment history records, time keeping systems, network and/or computer activity logs, global positioning system (GPS) data, accounting data such as invoices, social media, geographic information systems data, financial transactions data (e.g., stock trades and/or other types of financial transactions), asset management systems data, network activity logs, onboard computer logs, computer forensic artifacts data, point of sale systems data, product lifecycle management systems, and/or other types of data sources.

Performing an analysis of the disparate data source can be done by performing data extractions from each source and then performing customized processing of the extracted data. Because the originating format of the data is often source specific, including different data formats and schemas, it is hard if not impossible to optimize the data extraction. Thus, this process is difficult and laborious. After extraction, each data set must be processed and analyzed based on the information available within that data set, and results compared against other data sets. Furthermore, adding additional data sources is difficult, because new data extraction efforts will be needed as well as a new form of processing, because the new data source is likely to have a different data format and elements of information that need to be considered.

SUMMARY OF THE DESCRIPTION

A method and apparatus of a device that transforms data is described. In an exemplary embodiment, the device receives data from the plurality of data sources, wherein the plurality of data sources has different data formats. In addition, for each of the plurality of data sources, the device selects a field of information for transformation for that data source and expands the selected first set of columns into a set of rows, wherein each of the rows has an identical data format. Furthermore, the device combines the plurality of sets of rows having an identical data format into a transformed data set.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
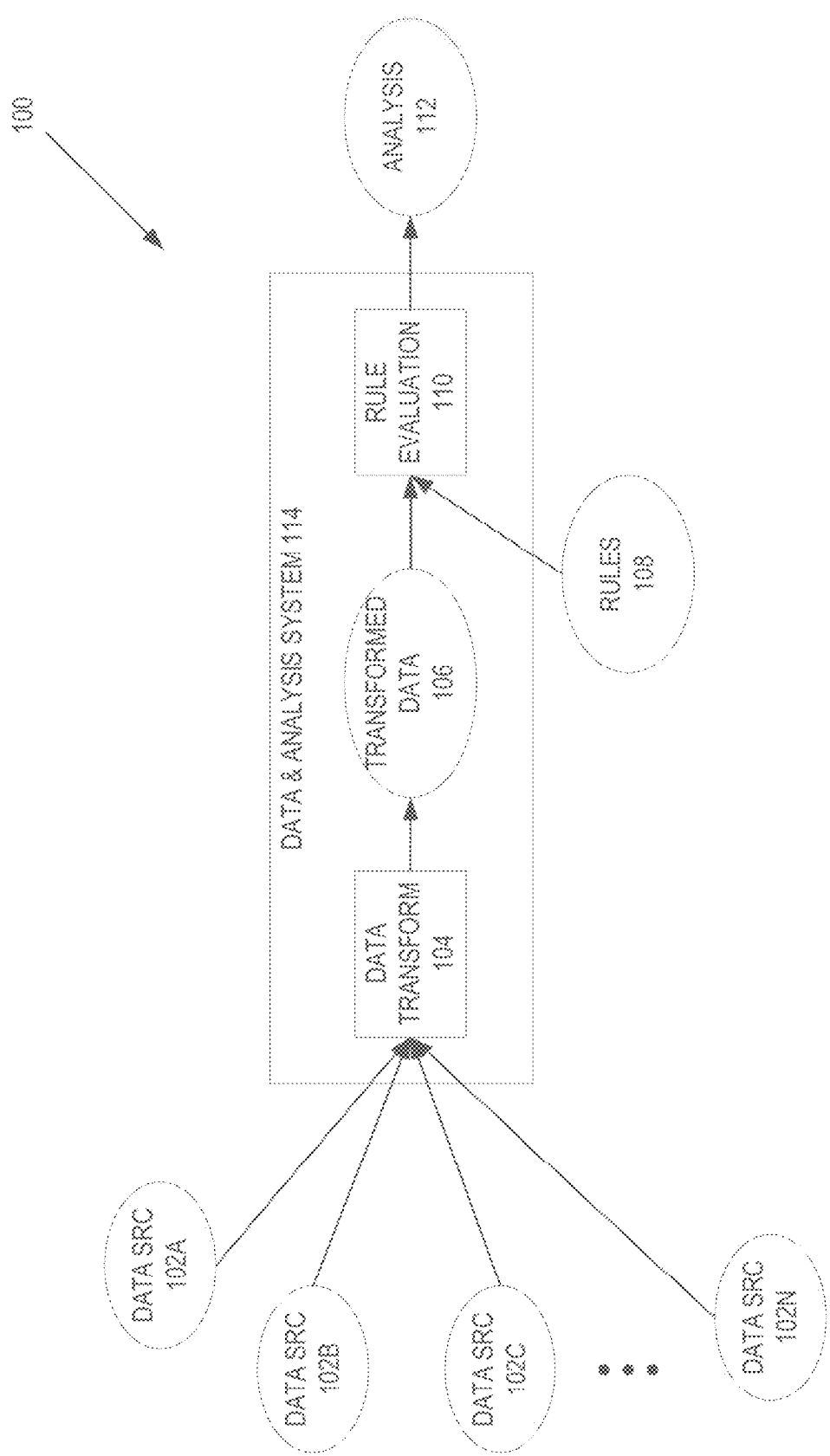
FIG. 1 is a block diagram of one embodiment of a data and analysis system that transforms data from different data sources, where the transformed data can be used for further analysis.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that transforms data is described. In one embodiment, a device transforms data sets A, B, C to transformed data sets A', B', C'. In one embodiment, the transformation can be described as transposing A to A' such that every field for a selected column in A is transformed into a single row in A'. This is further augmented with contextual data (e.g., metadata) related to that data element. This can produce many more rows in A'. Where the data elements in A are equal to R(A) (the number of rows in "A") times C(A) (the number of columns in "A"), then R(A)×C(A)=R(A')×1 Alternatively, this may not be the actual ratio relationship for two reasons: (i) each entry in A' may come from a single field, but also from a combination of fields, in A; (ii) multiple fields in A' may come from one field in A; and (iii) each field in A may not be needed or desired in A'.

In one embodiment, the transformed data is more efficient for analysis than the scheme outlined above. This is due to several factors. One, each transformed data set (A', B', C') is formatted in the same universal format (e.g., this means they have identical columns for each row of data). Second, not only does each record in the universal format have an identical layout, an analysis can be performed in the universal format is done in a way that has the universal format layout as inputs and the universal format layout as outputs. This makes every data set from the universal format, whether a sub-set, super-set, or derived-set, interchangeable from a formatting, analysis, handling, and reporting perspective. Third, the universal format allows more efficient calculations and analyses by (a) the computer and (b) the user. In one embodiment, a format for data can be an original storage of data, a file format, data schema, data model, virtual mapping, data views, and/or any type of data structure, data description, or data representation for storing data.

In a further embodiment, the device is decomposing A into individual data elements and associating metadata with each element related to how that data occurred (e.g., the who, what, when, where, and/or duration of each data element). By modeling the data as individual events that have identity in time and space, the device creates a uniformity that enables the analyses to be optimized for a single data set, which can translate to the other data sets.

In a further embodiment, the device is not just decomposing A. The device is selectively abstracting A at the same time. As a result, the device may not automatically end up with strictly R(A)×C(A) rows. "A" may contain data that is not relevant to the analyst. The device transforms f(A→A') on a selective basis (or may transform f(A→A') and f(B→A') where A and B are two different systems each designed to do the same or similar conceptual work). In one embodiment, transferring the data can lead to data sources A, B and C to working better as A', B' and C' but also that the universal format can be designed to allow various functions f1, f2, and f3 to work with A', such that the operator can analyze A' with f1(A'), f2(A'), and f3(A'), then these transformed data sources are available for f1(B'), f2(B'), and f3(B'). If the first concept is connecting data to data, then the second concept is connecting data to function of data.

For example and in one embodiment, an analyst may have data sources for four facilities that have security access badge swipe systems. Each of these data sources uses a different licensed technology: Badge1, Badge2, Badge3, and Badge4. The device transforms each of these to the universal format, allowing for a normalized analysis of these various data sources: Badge1→Badge1', Badge2→Badge2', Badge3→Badge3', and Badge4→Badge4'. Furthermore, there may be three different devices installed for fleet for tracking vehicles (Track1, Track2, and Track3). The device transforms each of these to the universal format, allowing for a normalized analysis of these various data sources: Track1→Track1', Track2→Track2', Track3→Track3'). In addition, there is a subsidiary with an enterprise resource planning (ERP) system (MyERP) that tracks both Badge Swipes and GPS. In that case, the device transforms this MyERP data to Badge and Tracking data: MyERP→Badge5' and MyERP→Track4'. Each system is normalized to a set of generic application concepts, and the universal records across data sets (e.g. BADGE' versus GPS') are also identical in their layout and format.

In one embodiment, this means that (a) analysts do not have to deal with the nuances of the individual source systems while analyzing the data in the universal format, (b) analyses within BADGE' (e.g. compare Swipe-In to Swipe-Out) are designed and evaluated in a manner identical to analyses within GPS' (e.g. Vehicle Route, Favorite Locations, Top Speed) and analysis between Badge' to GPS' (First Badge versus First Movement).

Furthermore, the normalization of each of the prime data sets (e.g. Badge' and GPS') enhances the performance of the computer system. This is because storing, retrieving, and analyzing data in a consolidated and uniform table format is much faster. The device can optimize the system for that format and, even though on a given case the device may deal with thousands of tables and tens-of-thousands of fields from the original data sources, the device removes the risk of data system malfunction or sub-optimal performance. For example and in one embodiment, consider data sources that had 6,000+ tables, 132,000+ fields, and ~85 billion records. The device maps each of the records to the universal format such that the records are system compliant and every analysis can be optimized based on storage, retrieval, and indexing, because these records are stored in the universal format, where the record formats are identical and the data model is fully supported by choosing the optimal architecture.

Universal Format

FIG. 1 is a block diagram of one embodiment of a data and analysis system 114 that transforms data from different data sources 102A-N, where the transformed data 106 can be used for further analysis. In FIG. 1, multiple data sources 102A-N feed data into a data and analysis system 114. The device can represent one or separate devices, where each the separate devices can be a personal computer, laptop, server, mobile device (e.g., smartphone, laptop, etc.), network element, sensor, and/or any device capable of executing a process. Each of the multiple data sources 102A-N can be disparate data sources that overlapping or different types of data. For example and in one embodiment, the data sources 102A-N can be badge swipe data, electronic communication records (email, chats, text messages, etc.), phone records (landline, Private Branch Exchange (PBX), Voice Over Internet Protocol (VOIP), and/or mobile phone records), HRIS including payroll and employment history records, time keeping systems, network and/or computer activity logs, global positioning system (GPS) data, accounting data such as invoices, social media and/or other types of data sources. Each of these data sources 102A-N can have their own format. Because each of these data sources 102A-N can have different types of formats, it is difficult to perform analyses over the different data sources 102A-N. This is because each of the data sources can have their own format storing the data, and analysis system would have to unpack the data for each of the separate data sources 102A-N and run the analysis of data source formats.

In one embodiment, instead of performing the analysis from the data sources 102A-N in their native format, the data and analysis system 114 transforms the data from the data sources 102A-N into transformed data 106. In this embodiment, a data transform module 104 selects the relevant data from the data sources 102A-N and transforms the selected data using the data transform module 104 into the transformed data 106. Which data is selected depends, in one embodiment, on the type of data used for the analysis and/or timeframes to be analyzed. In one embodiment, the transformed data 106 is stored in a universal format, which allows for efficient processing of the transformed data 106 as compared with potentially processing the data from the data sources 102A-N in their native format.

In one embodiment, the data transform module 104 selects the data to be transformed for each of the data sources 102A-N. If one of the data sources 102A-N is organized in columns and rows of data, the data transform module 104 selects the relevant columns of data and transforms these selected columns into rows of expanded data in the universal format. In this embodiment, the data transform module 104 can take an N column data and transform this data into a series of up to N rows of transformed data. As another example and in one embodiment, the data transform module 104 can transform an N column payroll record into a series of up to N rows of payroll events, where each row represents one of the N column data.

For example and in one embodiment, an email record represents an email that was sent from person A to person B and person C at 11:02 AM. This is an email record that has four columns. The data transform module 104 could transform this email record into at least 3 rows of data: (1) a row of data that has the values "person A," "outgoing email," "11:02 AM," and "person B, person C"; (2) "person B," "incoming email," "11:02 AM," and "person A"; and (3) "person C," "incoming email," "11:02 AM," and "person A". The last field in each of the records is a relationship field that is used to indicate a relationship between the first three fields of the record to another person.

As described above, the data transfer module 104 transforms each of the data sources 102A-N into the transformed data 106 that has a universal format. In one embodiment, the universal format is a format that allows the data from the different data sources 102A-N to be stored in a consistent fashion. In this embodiment, each of the data selected from each of the data sources 102A-N can be stored in the universal format, such that this transformed data can be analyzed together. In one embodiment, by using the universal format, data sources can be easily added, filtered or removed and the analysis of the transformed data remains the same. Furthermore, and in one embodiment, each row of data in the universal format is associated with one type of event, such as an incoming email, outgoing email, GPS location, badge swipe, incoming phone call, outgoing phone call, message received, message sent, message posted, message read, message deleted, a particular payroll event (gross pay, net pay, one or more deductions, and/or a combination thereof), or another type of event from one of the data sources 102A-N. In one embodiment, relations to other data are handled through relationship column in the universal format. In this embodiment, relations to other rows in the universal format are handled in this relationship column. The universal format is further described in FIGS. 2 and 5 below.

By using the universal format, and in one embodiment, the transformed data is stored in a consistent fashion, which allows for very efficient searching of this transform data. In one embodiment, by using the data from the data sources 102A-N in their native format, searching among the different data sources 102A-N would be a laborious undertaking as separate customized searches are needed for each of the data sources 102A-N, retrieving intermediate results and processing those intermediate results. Each of these separate searches are custom to the particular data source 102A-N in the processing of the intermediate results are custom to each combination of the data sources 102A-N. In this embodiment, adding a new data source (or removing in existing data source) means that these customized searches have to be individually updated. In contrast, and in one embodiment, by transforming the data into the universal format, adding or removing of data sources means that the transformation of the data from the data sources 102A-N would be modified, but the analyses of the transformed data in the universal format remains the same. This increases the efficiency of the computer performing the analyses of the universal formatted data because the analyses do not have to change.

In another embodiment, by transforming the different data from the different data sources 102A-N into the universal format, data from different data sources 102A-N can be used to enrich data in the universal format. In this embodiment, empty fields in a row of data can be populated using other transform data in the universal format. Enriching the data is further described in FIG. 6 below.

With the transformed data, rules can be applied to the transformed data 106 to determine various properties, characteristics, and/or trends from the transformed data 106. In one embodiment, these rules can be implemented as queries of varying complexity that can be used to determine the various properties, characteristics, and/or trends from the transformed data 106. For example and in one embodiment, if the data sources include various types of payroll data, rules can be applied to determine characteristics such as amount of double-overtime used, if there was less than or more than 40 hours a week of regular pay, pay stubs with underpayments, and/or other types of properties, characteristics, and/or trends from this payroll data. Furthermore, the rules can be applied over various different time intervals (hours, days, weeks, and/or any other type of time interval). In addition, the rules can be applied over different locations. In one embodiment, one or more rules can be applied to determine timelines for one or more persons using the transformed data and/or metadata in the universal format. For example and of one embodiment, a "day in the life" timeline can be generated and presented using different formats (chart, bubble chart, overlaid on a map, and/or other types of presentation formats). This "day in the life" timeline can be generated for one or more people (or, alternatively, one or more dimensions of data).

Figure 2:
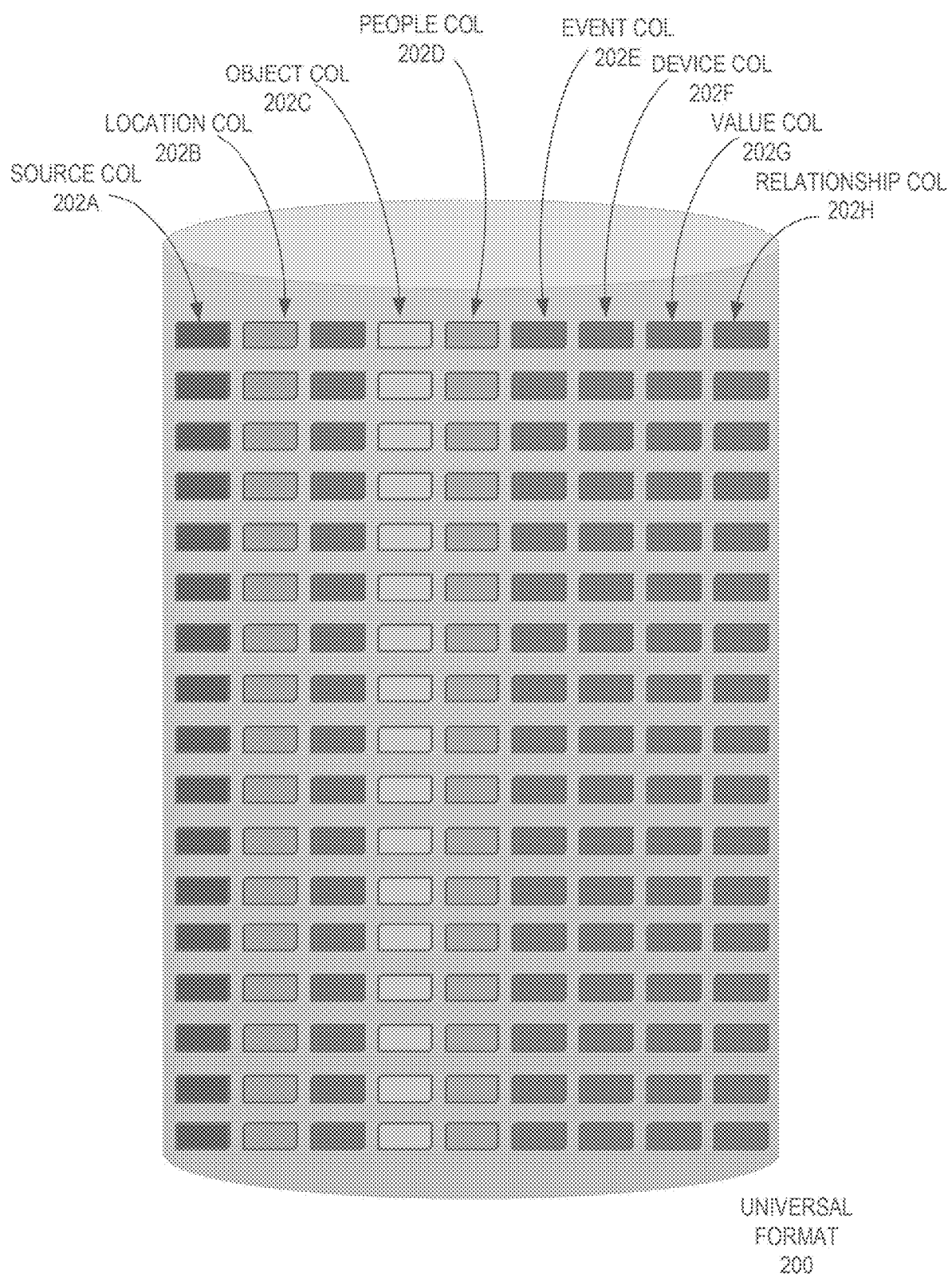
FIG. 2 is a block diagram of one embodiment of a universal format.

FIG. 2 is a block diagram of one embodiment of a universal format 200. In FIG. 2, the universal format 200 is illustrated with several columns 202A-H. In one embodiment, the universal format 200 is the format that is used to store the transformed data, such as the transformed data 106 as illustrated in FIG. 1 above. While in one embodiment, the universal format 200 is illustrated as 8 columns, in alternate embodiments, the universal format 200 can have more or less columns, with the same or different types of data. In one embodiment, the universal format 200 includes source column 202A, location column 202B, object column 202C, people column 202D, event column 202E, device column 202F, value column 202G, and relationship column 202H. In one embodiment the source column 202A represents the data source for that row (or equivalently, a record) (e.g., the data source that populates the data in this record). The location column 202B represents the location for that record (e.g., a location when the record was generated, whether measured or inferred). While in one embodiment, a location can be a physical location, in alternate embodiments, a location can be another type of location (e.g., a location derived from social media content as in one or more events occurred in the social media, a cyber location such as a network (whether physical or logical) or another type of cyber location, and/or another type of location). In a further embodiment, the type of location is an attribute of the location dimension. The object column 202C represents the object for that record. The people column 202D represents the person for that record (e.g., the person who was associated with this record, such as the email recipient, email sender, person who was at this location, etc.). The event column 202E represents the event for that record. The event can give context for the record (e.g., sent email, received email, badge swiped, phone call received, phone call made, etc.). The device column 202F represents the device associated with this record (e.g., device that captured or measured the location, device that received/sent the email or phone call, badge that was swiped, etc.). The value column 202G represents a value for the record. The relationship column 202H represents the relationship for that record with other records.

Figure 3:
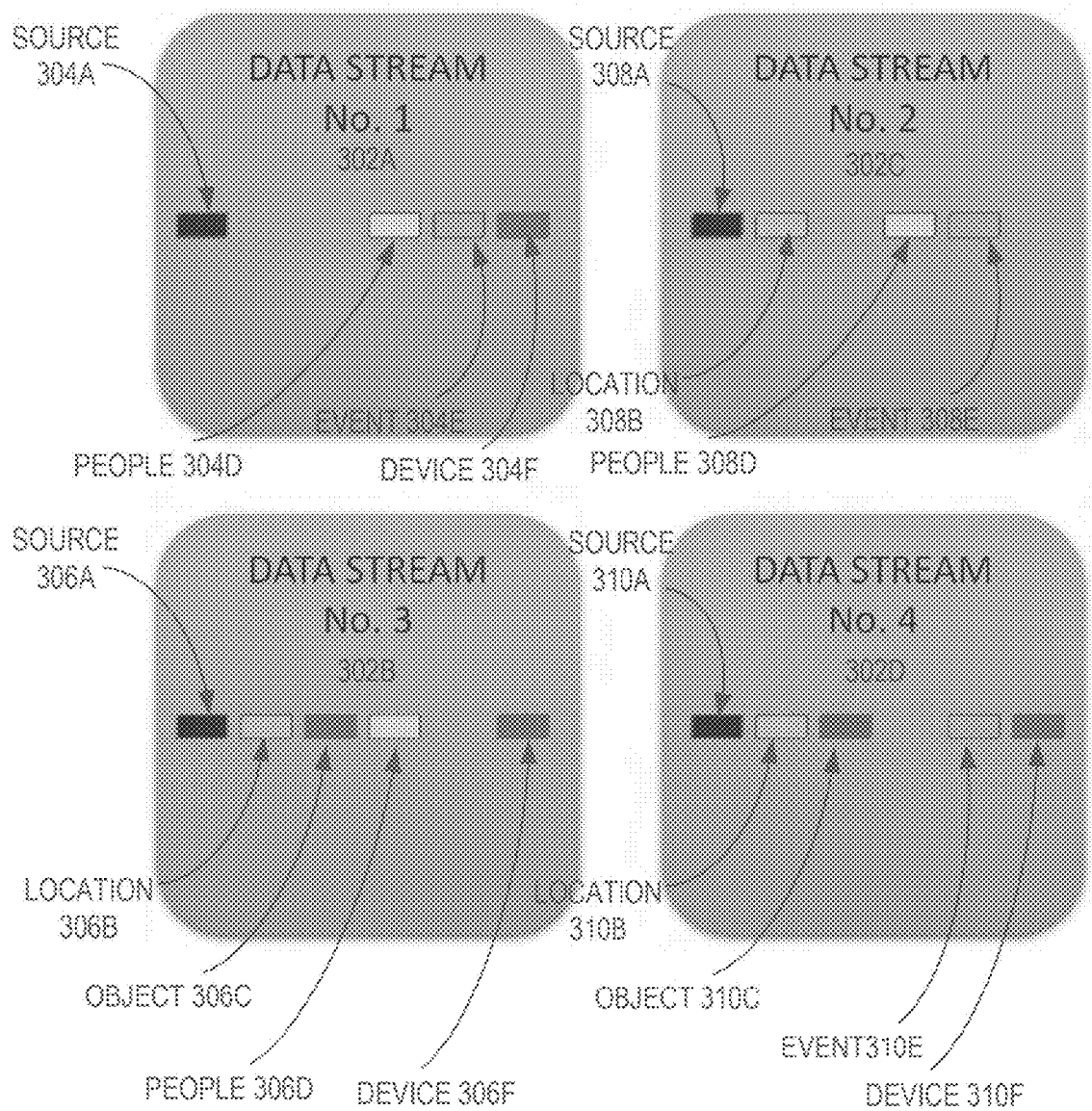
FIG. 3 is a block diagram of one embodiment of several data sources.

FIG. 3 is a block diagram of one embodiment of several data sources 302A-D. In FIG. 3, four data sources 302A-D are illustrated. In one embodiment, each of the data sources 302A-D (or equivalently, data streams) generates the raw data that will be transformed into the universal format. As illustrated in FIG. 3, there is not one data source 302A-D that includes all of the columns for the universal format. This is because not any one data source 302A-D captures all the data for each of the columns in the universal format. For example and in one embodiment, data source 302 data source 302A include source column 304A, people column 304D, event column 304E, and device column 304F. Data source 302B includes source column 306A, location column 306B, object column 306C, people column 306D, and device column 306F. The data source 302C includes source column 308A, location column 308B, people column 308D, and event column 308E. Lastly, the data stream 302D includes source column 310A, location column 310B, object column 310C, event column 310E, and device column 310F. In one embodiment, the data sources 302A-D have overlapping columns, but none of the data sources 302A-D have the same set of columns. Furthermore, even though some of the data sources 302A-D have overlapping columns, the data represented by these columns may have different context and/or meaning. For example and in one embodiment both the data sources 302B and C have people columns (e.g., 306D and 308D, respectively), but data source 302B may be a data source for location, in which case the people column 306D may represent the person who had a GPS device, and data source 302C may be a data source for badge swipe, in which case the people column 308D may represent the person who swiped their badge. In addition, each of the data sources 302A-D has missing columns. For example and in one embodiment, data source 302A does not include a location or object column, data source 302B does not include an event column, data source 302C does not include an object column or a device column, and data source 302D does not include the people column. Thus, these disparate data source 302A-D have varying data formats and/or different scopes of data.

Figure 4:
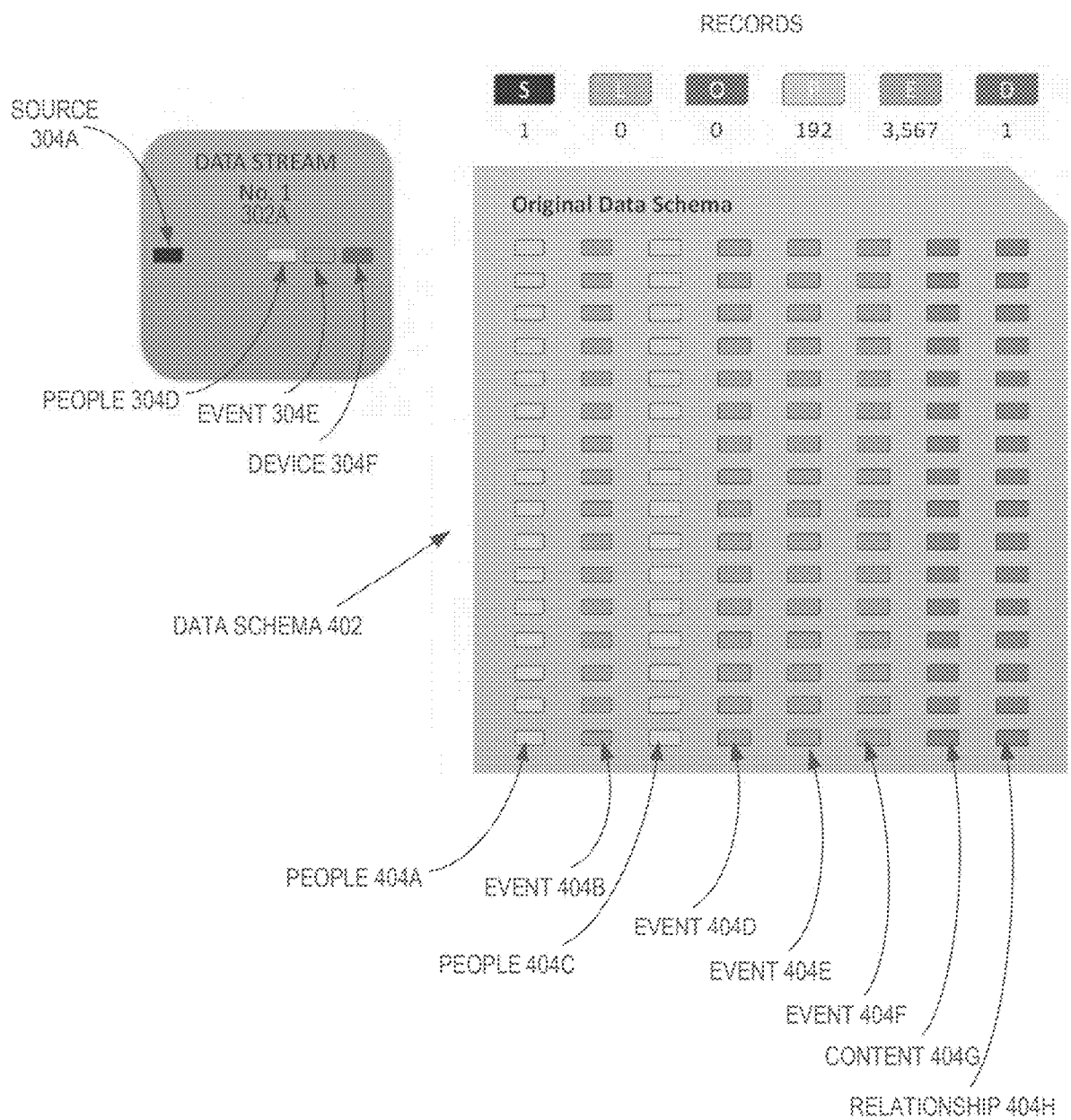
FIG. 4 is a block diagram of one embodiment of a data source with a data schema.

FIG. 4 is a block diagram of one embodiment of a data source 302A with a data schema 402. In FIG. 4, the data source 302A is illustrated with an associated data schema 402. In one embodiment, data source 302A includes source column 304A, people column 304D, event column 304E, and device column 304F. In addition, the data source 302A has an associated data schema 402 that is used to define the format in which the data for the data source 302A is stored. In this embodiment, the data schema 402 includes people column 404A, a first event column 404B, a first people column 404C, a second people column 404C, a second event column 404D, a third event column 404E, a fourth event column 404F, a content column 404G, and a relationship column 404H. As illustrated, the data schema 402 includes two people columns and four event columns, as well as a content column and a relationship column. In addition, the data source 302A includes numerous records including one source, zero locations, zero objects, 192 people, 3567 events and one device.

Figure 5:
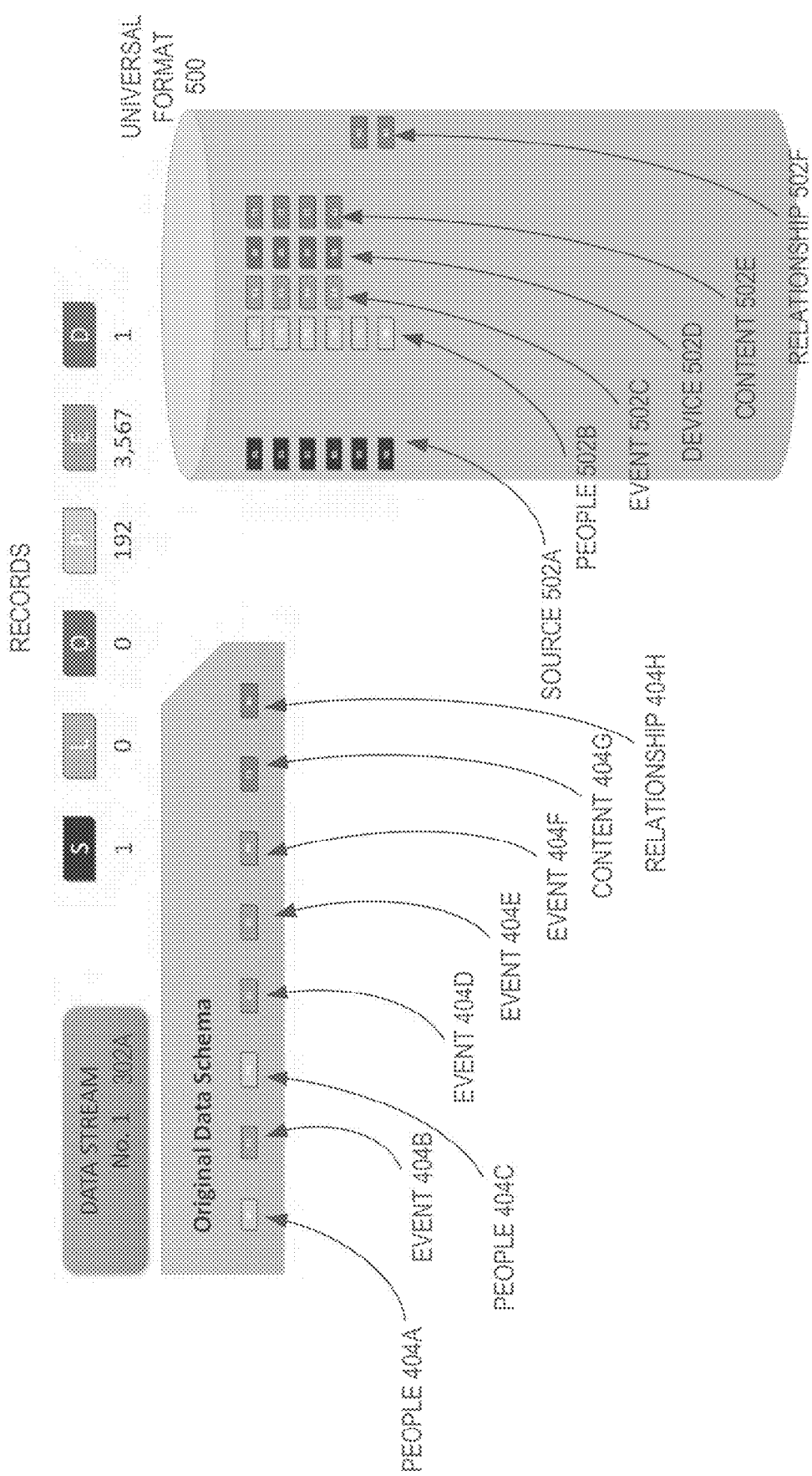
FIG. 5 is a block diagram of one embodiment of a data source, data schema, and transformation to a universal format.

FIG. 5 is a block diagram of one embodiment of a data source 302A, data schema 402 and transformation to a universal format 500. In FIG. 5, the data source 302A includes the data schema 400 with people column 404A, a first event column 404B, a first people column 404C, a second people column 404C, a second event column 404D, a third event column 404E, a fourth event column 404F, a content column 404G, and a relationship column 404H. In one embodiment, data that is in this data schema 400 will get transformed into the universal format that includes source column 502A, people column 502B, event column 502C, device column 502D, content column 502E, and relationship column 502F. In this embodiment, the data that is in the original data schema 400 is transformed into a set of records for the universal format 500. For example and in one embodiment, the four different event columns in the data schema 400 are transformed into four different rows for each row of data in the data schema 400. Similarly, the two different people columns are transformed into two different rows for each row of data in the data schema 400. In addition, if desired, the content column in the data schema 400 is transformed into a corresponding row for each row of data in the data schema 400. Furthermore, if desired, the relationship column in the data schema 400 is transformed into a corresponding row for each row of data in the data schema 400.

DETAILED EXAMPLES

As described above, data source can be transformed and combined into a universal format. Below is an illustration of transforming and combining three different data sets from different data sources. In one embodiment, a data source produces data set DATA_01 (below). This data set includes three columns of data (A, B, and C) with two rows.

| Data Set DATA_01 | | |
|---|---|---|
| A | B | C |
| A001 | B001 | C001 |
| A002 | B002 | C002 |

The data and analysis system can transform the data set DATA_01 into data set DATA_01' by selecting an expansion of rows for columns A and B, where the data for column C is carried along in the row expansion. This leads to the data set DATA_01' (below).

| Data Set DATA_01' | | | | |
|---|---|---|---|---|
| SOURCE | FACT | C | D | E |
| DATA_01 | A001 | C001 | | |
| DATA_01 | A002 | C002 | | |
| DATA_01 | B001 | C001 | | |
| DATA_01 | B002 | C002 | | |

By way of an abstracted example, the data for the columns A and B in DATA_01', are transformed into separate rows for data A001, A002, B001, and B002. The newly created "FACT" field contains the value for A and B. In addition, a new column is added that designates the source of the data for each row.

Furthermore, there can be a second data set, DATA_02, which includes columns A, C, and D (below). The transformation of DATA_02 to DATA_02' is accomplished, in one embodiment, by expanding the values in the A column to a FACT column and carrying forward the values in the C and D columns for the corresponding A values (below).

| Data Set DATA_02 | | |
|---|---|---|
| A | C | D |
| A003 | C003 | D003 |
| A004 | C004 | D004 |

| Data Set DATA_02' | | | | |
|---|---|---|---|---|
| SOURCE | FACT | C | D | E |
| DATA_02 | A003 | C003 | D003 | |
| DATA_02 | A004 | C004 | D004 | |

Similarly, DATA_03 can be transformed to DATA_03' by expanding the values in the B column to the FACT column and carrying forward the values in the D and E columns for the corresponding B values (below).

| Data Set DATA_03 | | |
|---|---|---|
| B | D | E |
| B005 | D005 | E005 |
| B006 | D006 | E006 |

| Data Set DATA_03' | | | | |
|---|---|---|---|---|
| SOURCE | FACT | C | D | E |
| DATA_03 | B005 | | D005 | E005 |
| DATA_03 | B006 | | D006 | E006 |

In one embodiment, with the resulting data sets of DATA_01', DATA_02', and DATA_03' are transformed into a set of columns that can be combined into a universal format for the three data sets.

| Combined Universal Format | | | | |
|---|---|---|---|---|
| SOURCE | FACT | C | D | E |
| DATA_01 | A001 | C001 | | |
| DATA_01 | A002 | C002 | | |
| DATA_01 | B001 | C001 | | |
| DATA_01 | B002 | C002 | | |
| DATA_02 | A003 | C003 | D003 | |
| DATA_02 | A004 | C004 | D004 | |
| DATA_03 | B005 | | D005 | E005 |
| DATA_03 | B006 | | D006 | E006 |

In this embodiment, the combined universal format has columns of SOURCE (for the source of the data, in this case, DATA_01, DATA_02, or DATA_03), TYPE (used for the A and B column values), C, D, and E. The last three columns (C, D, and E) have the original values for C, D, or E that correspond to the A or B values in the FACT column. In one embodiment, by performing the data transformations for data sets DATA_01, DATA_02, or DATA_03, the transformed data sets can be combined into the universal format and used for an efficient analysis later. In one embodiment, the combined universal format has several rows with missing values. For example and in one embodiment, the second row does not have values for the D and E columns. In this embodiment, the data and analysis system can enrich the data in the universal format, as shown below.

| Enhanced Universal Format | | | | |
|---|---|---|---|---|
| SOURCE | FACT | C | D | E |
| DATA_01 | A001 | C001 | | |
| DATA_01 | A002 | C002 | D002* | E002* |
| DATA_01 | B001 | C001 | D003* | E003* |
| DATA_01 | B002 | C002 | | |
| DATA_02 | A003 | C003 | D003 | |
| DATA_02 | A004 | C004 | D004 | E004* |
| DATA_03 | B005 | | D005 | E005 |
| DATA_03 | B006 | C006* | D006 | E006 |

In one embodiment, new values in the enhanced universal format (marked with an *) have been added through the enrichment process.

In a further embodiment, phone and email records from different data sources can be transformed into intermediate formats that can be combined into a universal format. For example, phone records (below) can be transformed by expanding the first phone number ("PH1") and second phone numbers (PH2) into separate rows for each of these phone numbers and carrying along the corresponding values for the other columns (Phone Records Prime).

Phone Records

| PER | PH1 | LOCATION | PH2 | IN/OUT | LOCATION | DATE | TIME | DURATION |
|---|---|---|---|---|---|---|---|---|
| P001 | NBR01 | NEW ORLEANS | NBR02 | OUT | NEW ORLEANS | Jan. 1, 2018 | 6:05 AM | 5 |
| P001 | NBR01 | NEW ORLEANS | NBR03 | OUT | KENNER | Jan. 1, 2018 | 6:20 AM | 15 |
| P001 | NBR01 | NEW ORLEANS | NBR04 | OUT | NEW ORLEANS | Jan. 1, 2018 | 7:30 AM | 3 |
| P001 | NBR01 | NEW ORLEANS | NBR03 | IN | KENNER | Jan. 1, 2018 | 8:47 AM | 30 |
| P001 | NBR01 | KENNER | NBR05 | OUT | SLIDELL | Jan. 1, 2018 | 10:32 AM | 2 |
| P001 | NBR01 | KENNER | NBR06 | IN | METARIE | Jan. 1, 2018 | 12:04 PM | 3 |
| P001 | NBR01 | NEW ORLEANS | NBR07 | OUT | NEW ORLEANS | Jan. 1, 2018 | 3:01 PM | 1 |
| P001 | NBR01 | NEW ORLEANS | NBR08 | IN | METARIE | Jan. 1, 2018 | 5:20 PM | 15 |

Phone Records Prime

| REC | SRC | TYPE | PER | LOCATION | DATE | TIME | OTHER | LINK |
|---|---|---|---|---|---|---|---|---|
| R001 | NBR01 | CALL OUT | P001 | NEW ORLEANS | Jan. 1, 2018 | 6:05 AM | Duration: 5 | R009 |
| R002 | NBR01 | CALL OUT | P001 | NEW ORLEANS | Jan. 1, 2018 | 6:20 AM | Duration: 15 | R010 |
| R003 | NBR01 | CALL OUT | P001 | NEW ORLEANS | Jan. 1, 2018 | 7:30 AM | Duration: 3 | R011 |
| R004 | NBR01 | CALL IN | P001 | NEW ORLEANS | Jan. 1, 2018 | 8:47 AM | Duration: 30 | R012 |
| R005 | NBR01 | CALL OUT | P001 | KENNER | Jan. 1, 2018 | 10:32 AM | Duration: 2 | R013 |
| R006 | NBR01 | CALL IN | P001 | KENNER | Jan. 1, 2018 | 12:04 PM | Duration: 3 | R014 |
| R007 | NBR01 | CALL OUT | P001 | NEW ORLEANS | Jan. 1, 2018 | 3:01 PM | Duration: 1 | R015 |
| R008 | NBR01 | CALL IN | P001 | NEW ORLEANS | Jan. 1, 2018 | 5:20 PM | Duration: 15 | R016 |
| R009 | NBR02 | CALL IN | | NEW ORLEANS | Jan. 1, 2018 | 6:05 AM | Duration: 5 | R001 |
| R010 | NBR03 | CALL IN | | KENNER | Jan. 1, 2018 | 6:20 AM | Duration: 15 | R002 |
| R011 | NBR04 | CALL IN | | NEW ORLEANS | Jan. 1, 2018 | 7:30 AM | Duration: 3 | R003 |
| R012 | NBR03 | CALL OUT | | KENNER | Jan. 1, 2018 | 8:47 AM | Duration: 30 | R004 |
| R013 | NBR05 | CALL IN | | SLIDELL | Jan. 1, 2018 | 10:32 AM | Duration: 2 | R005 |
| R014 | NBR06 | CALL OUT | | METARIE | Jan. 1, 2018 | 12:04 PM | Duration: 3 | R006 |
| R015 | NBR07 | CALL IN | | NEW ORLEANS | Jan. 1, 2018 | 3:01 PM | Duration: 1 | R007 |
| R016 | NBR08 | CALL OUT | | METARIE | Jan. 1, 2018 | 5:20 PM | Duration: 15 | R008 |

In one embodiment, an additional column is added to track the record identifier. In this embodiment, by expanding the two columns in the original Phone Records, twice the number of rows of data is produced. In addition, the duration for each row is added to the OTHER column and the data in the LINK column is used to indicate a relationship for the row. The OTHER column can be used to indicate a context for that row. Furthermore, the email records may have the following structure:

EMAIL RECORDS

| SENDER | RECEIPIENT | DATE | TIME | SUBJ | BODY |
|---|---|---|---|---|---|
| P001 | P012 | Jan. 1, 2018 | 6:30 AM | S001 | B001 |
| P001 | P037 | Jan. 1, 2018 | 7:30 AM | S002 | B002 |

EMAIL RECORDS -continued

| SENDER | RECEIPIENT | DATE | TIME | SUBJ | BODY |
|---|---|---|---|---|---|
| P001 | P022 | Jan. 1, 2018 | 8:30 AM | S003 | B003 |
| P001 | P098 | Jan. 1, 2018 | 9:30 AM | S004 | B004 |
| P001 | P234 | Jan. 1, 2018 | 10:30 AM | S005 | B005 |
| P001 | P002 | Jan. 1, 2018 | 11:30 AM | S006 | B006 |
| P001 | P037 | Jan. 1, 2018 | 12:30 PM | S007 | B007 |

These email records can be transformed by expanding the sender and recipient columns into values for Type and Person (PER) columns. This transformation into the Universal Format allows for combination with the Phone Records in the Universal Format.

EMAIL RECORDS PRIME (UDF)

| REC | SRC | TYPE | PER | LOC | DATE | TIME | OTHER | LINK |
|---|---|---|---|---|---|---|---|---|
| R017 | PST01 | EMAIL OUT | P001 | | Jan. 1, 2018 | 6:30 AM | SUBJECT: S001 | R024 |
| R018 | PST01 | EMAIL OUT | P001 | | Jan. 1, 2018 | 7:30 AM | SUBJECT: S002 | R025 |
| R019 | PST01 | EMAIL OUT | P001 | | Jan. 1, 2018 | 8:30 AM | SUBJECT: S003 | R026 |
| R020 | PST01 | EMAIL OUT | P001 | | Jan. 1, 2018 | 9:30 AM | SUBJECT: S004 | R027 |
| R021 | PST01 | EMAIL OUT | P001 | | Jan. 1, 2018 | 10:30 AM | SUBJECT: S005 | R028 |
| R022 | PST01 | EMAIL OUT | P001 | | Jan. 1, 2018 | 11:30 AM | SUBJECT: S006 | R029 |
| R023 | PST01 | EMAIL OUT | P001 | | Jan. 1, 2018 | 12:30 PM | SUBJECT: S007 | R030 |
| R024 | PST01 | EMAIL IN | P012 | | Jan. 1, 2018 | 6:30 AM | SUBJECT: S001 | R017 |
| R025 | PST01 | EMAIL IN | P037 | | Jan. 1, 2018 | 7:30 AM | SUBJECT: S002 | R018 |
| R026 | PST01 | EMAIL IN | P022 | | Jan. 1, 2018 | 8:30 AM | SUBJECT: S003 | R019 |
| R027 | PST01 | EMAIL IN | P098 | | Jan. 1, 2018 | 9:30 AM | SUBJECT: S004 | R020 |
| R028 | PST01 | EMAIL IN | P234 | | Jan. 1, 2018 | 10:30 AM | SUBJECT: S005 | R021 |
| R029 | PST01 | EMAIL IN | P002 | | Jan. 1, 2018 | 11:30 AM | SUBJECT: S006 | R022 |
| R030 | PST01 | EMAIL IN | P037 | | Jan. 1, 2018 | 12:30 PM | SUBJECT: S007 | R023 |

In this embodiment, the transformed email records (EMAIL RECORDS PRIME), the person data is expended into the PER column and values for the SRC column are added (PST01). In addition, the subject for each row is added to the OTHER column and the data in the LINK column is used to indicate a relationship for the row. Furthermore, because the email records do not have any location data, the location column is empty. With both the email and phone records in the same format (e.g., the universal format), these sets of transformed data can be combined.

| | | | | Combined Universal Format | | | | |
|---|---|---|---|---|---|---|---|---|
| REC | SRC | TYPE | PER | LOCATION | DATE | TIME | OTHER | LINK |
| R001 | NBR01 | CALL OUT | P001 | NEW ORLEANS | Jan. 1, 2018 | 6:05 AM | Duration: 5 | R009 |
| R002 | NBR01 | CALL OUT | P001 | NEW ORLEANS | Jan. 1, 2018 | 6:20 AM | Duration: 15 | R010 |
| R003 | NBR01 | CALL OUT | P001 | NEW ORLEANS | Jan. 1, 2018 | 7:30 AM | Duration: 3 | R011 |
| R004 | NBR01 | CALL IN | P001 | NEW ORLEANS | Jan. 1, 2018 | 8:47 AM | Duration: 30 | R012 |
| R005 | NBR01 | CALL OUT | P001 | KENNER | Jan. 1, 2018 | 10:32 AM | Duration: 2 | R013 |
| R006 | NBR01 | CALL IN | P001 | KENNER | Jan. 1, 2018 | 12:04 PM | Duration: 3 | R014 |
| R007 | NBR01 | CALL OUT | P001 | NEW ORLEANS | Jan. 1, 2018 | 3:01 PM | Duration: 1 | R015 |
| R008 | NBR01 | CALL IN | P001 | NEW ORLEANS | Jan. 1, 2018 | 5:20 PM | Duration: 15 | R016 |
| R009 | NBR02 | CALL IN | | NEW ORLEANS | Jan. 1, 2018 | 6:05 AM | Duration: 5 | R001 |
| R010 | NBR03 | CALL IN | | KENNER | Jan. 1, 2018 | 6:20 AM | Duration: 15 | R002 |
| R011 | NBR04 | CALL IN | | NEW ORLEANS | Jan. 1, 2018 | 7:30 AM | Duration: 3 | R003 |
| R012 | NBR03 | CALL OUT | | KENNER | Jan. 1, 2018 | 8:47 AM | Duration: 30 | R004 |
| R013 | NBR05 | CALL IN | | SLIDELL | Jan. 1, 2018 | 10:32 AM | Duration: 2 | R005 |
| R014 | NBR06 | CALL OUT | | METARIE | Jan. 1, 2018 | 12:04 PM | Duration: 3 | R006 |
| R015 | NBR07 | CALL IN | | NEW ORLEANS | Jan. 1, 2018 | 3:01 PM | Duration: 1 | R007 |
| R016 | NBR08 | CALL OUT | | METARIE | Jan. 1, 2018 | 5:20 PM | Duration: 15 | R008 |
| R017 | PST01 | EMAIL OUT | P001 | | Jan. 1, 2018 | 6:30 AM | SUBJECT: S001 | R024 |
| R018 | PST01 | EMAIL OUT | P001 | | Jan. 1, 2018 | 7:30 AM | SUBJECT: S002 | R025 |
| R019 | PST01 | EMAIL OUT | P001 | | Jan. 1, 2018 | 8:30 AM | SUBJECT: S003 | R026 |
| R019 | PST01 | EMAIL OUT | P001 | | Jan. 1, 2018 | 8:30 AM | SUBJECT: S003 | R026 |
| R020 | PST01 | EMAIL OUT | P001 | | Jan. 1, 2018 | 9:30 AM | SUBJECT: S004 | R027 |
| R021 | PST01 | EMAIL OUT | P001 | | Jan. 1, 2018 | 10:30 AM | SUBJECT: S005 | R028 |
| R022 | PST01 | EMAIL OUT | P001 | | Jan. 1, 2018 | 11:30 AM | SUBJECT: S006 | R029 |
| R023 | PST01 | EMAIL OUT | P001 | | Jan. 1, 2018 | 12:30 PM | SUBJECT: S007 | R030 |
| R024 | PST01 | EMAIL IN | P012 | | Jan. 1, 2018 | 6:30 AM | SUBJECT: S001 | R017 |
| R025 | PST01 | EMAIL IN | P037 | | Jan. 1, 2018 | 7:30 AM | SUBJECT: S002 | R018 |
| R026 | PST01 | EMAIL IN | P022 | | Jan. 1, 2018 | 8:30 AM | SUBJECT: S003 | R019 |
| R027 | PST01 | EMAIL IN | P098 | | Jan. 1, 2018 | 9:30 AM | SUBJECT: S004 | R020 |
| R028 | PST01 | EMAIL IN | P234 | | Jan. 1, 2018 | 10:30 AM | SUBJECT: S005 | R021 |
| R029 | PST01 | EMAIL IN | P002 | | Jan. 1, 2018 | 11:30 AM | SUBJECT: S006 | R022 |
| R030 | PST01 | EMAIL IN | P037 | | Jan. 1, 2018 | 12:30 PM | SUBJECT: S007 | R023 |

The combined universal format includes the rows from the transformed phone and email records. As noted above, the transformed email records do not include location data. In one embodiment, by combining the two data sources, location data can be inferred for some or all of the missing location data.

| | | | | Enriched Universal Format | | | | |
|---|---|---|---|---|---|---|---|---|
| REC | SRC | TYPE | PER | LOCATION | DATE | TIME | OTHER | LINK |
| R001 | NBR01 | CALL OUT | P001 | NEW ORLEANS | Jan. 1, 2018 | 6:05 AM | Duration: 5 | R009 |
| R002 | NBR01 | CALL OUT | P001 | NEW ORLEANS | Jan. 1, 2018 | 6:20 AM | Duration: 15 | R010 |
| R003 | NBR01 | CALL OUT | P001 | NEW ORLEANS | Jan. 1, 2018 | 7:30 AM | Duration: 3 | R011 |
| R004 | NBR01 | CALL IN | P001 | NEW ORLEANS | Jan. 1, 2018 | 8:47 AM | Duration: 30 | R012 |
| R005 | NBR01 | CALL OUT | P001 | KENNER | Jan. 1, 2018 | 10:32 AM | Duration: 2 | R013 |
| R006 | NBR01 | CALL IN | P001 | KENNER | Jan. 1, 2018 | 12:04 PM | Duration: 3 | R014 |
| R007 | NBR01 | CALL OUT | P001 | NEW ORLEANS | Jan. 1, 2018 | 3:01 PM | Duration: 1 | R015 |
| R008 | NBR01 | CALL IN | P001 | NEW ORLEANS | Jan. 1, 2018 | 5:20 PM | Duration: 15 | R016 |
| R009 | NBR02 | CALL IN | | NEW ORLEANS | Jan. 1, 2018 | 6:05 AM | Duration: 5 | R001 |
| R010 | NBR03 | CALL IN | | KENNER | Jan. 1, 2018 | 6:20 AM | Duration: 15 | R002 |
| R011 | NBR04 | CALL IN | | NEW ORLEANS | Jan. 1, 2018 | 7:30 AM | Duration: 3 | R003 |
| R012 | NBR03 | CALL OUT | | KENNER | Jan. 1, 2018 | 8:47 AM | Duration: 30 | R004 |
| R013 | NBR05 | CALL IN | | SLIDELL | Jan. 1, 2018 | 10:32 AM | Duration: 2 | R005 |
| R014 | NBR06 | CALL OUT | | METARIE | Jan. 1, 2018 | 12:04 PM | Duration: 3 | R006 |
| R015 | NBR07 | CALL IN | | NEW ORLEANS | Jan. 1, 2018 | 3:01 PM | Duration: 1 | R007 |
| R016 | NBR08 | CALL OUT | | METARIE | Jan. 1, 2018 | 5:20 PM | Duration: 15 | R008 |
| R017 | PST01 | EMAIL OUT | P001 | N ORL (95%) | Jan. 1, 2018 | 6:30 AM | SUBJECT: S00 | R024 |

-continued

Enriched Universal Format

| REC | SRC | TYPE | PER | LOCATION | DATE | TIME | OTHER | LINK |
|---|---|---|---|---|---|---|---|---|
| R018 | PST01 | EMAIL OUT | P001 | N ORL (100%) | Jan. 1, 2018 | 7:30 AM | SUBJECT: S002 | R025 |
| R019 | PST01 | EMAIL OUT | P001 | N ORL (75%) | Jan. 1, 2018 | 8:30 AM | SUBJECT: S003 | R026 |
| R020 | PST01 | EMAIL OUT | P001 | KENNER (51%) | Jan. 1, 2018 | 9:30 AM | SUBJECT: S004 | R027 |
| R021 | PST01 | EMAIL OUT | P001 | KENNER (95%) | Jan. 1, 2018 | 10:30 AM | SUBJECT: S005 | R028 |
| R022 | PST01 | EMAIL OUT | P001 | KENNER (75%) | Jan. 1, 2018 | 11:30 AM | SUBJECT: S006 | R029 |
| R023 | PST01 | EMAIL OUT | P001 | KENNER (60%) | Jan. 1, 2018 | 12:30 PM | SUBJECT: S007 | R030 |
| R024 | PST01 | EMAIL IN | P012 | | Jan. 1, 2018 | 6:30 AM | SUBJECT: S001 | R017 |
| R025 | PST01 | EMAIL IN | P037 | | Jan. 1, 2018 | 7:30 AM | SUBJECT: S002 | R018 |
| R026 | PST01 | EMAIL IN | P022 | | Jan. 1, 2018 | 8:30 AM | SUBJECT: S003 | R019 |
| R027 | PST01 | EMAIL IN | P098 | | Jan. 1, 2018 | 9:30 AM | SUBJECT: S004 | R020 |
| R028 | PST01 | EMAIL IN | P234 | | Jan. 1, 2018 | 10:30 AM | SUBJECT: S005 | R021 |
| R029 | PST01 | EMAIL IN | P002 | | Jan. 1, 2018 | 11:30 AM | SUBJECT: S006 | R022 |
| R030 | PST01 | EMAIL IN | P037 | | Jan. 1, 2018 | 12:30 PM | SUBJECT: S007 | R023 |

In this embodiment, for records R017-R023, location data (italicized) is inferred for other email records, along with a confidence value (in parentheses).

Universal Format Transformation and Analysis

Figure 6:
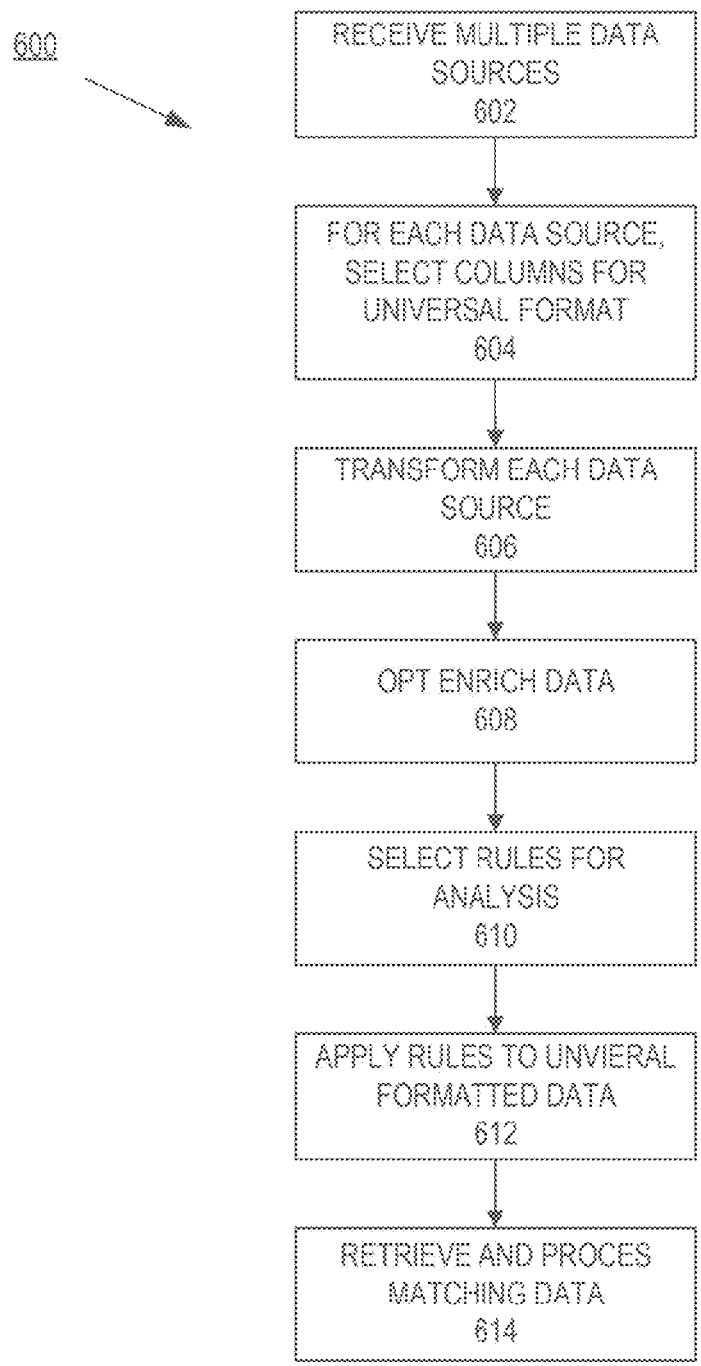
FIG. 6 is a flow diagram of one embodiment of a process to transform data from one or more data sources and process the transformed data.

FIG. 6 is a flow diagram of one embodiment of a process 600 to transform data from one or more data sources and process the transformed data. In FIG. 6, process 600 begins by receiving multiple data sources of data at block 602. In one embodiment, there can be a wide variety of data sources that are received by process 600. For example and in one embodiment, the data sources can be badge swipe data, electronic communication records (email, chats, text messages, etc.), phone records (landline, PBX, VOIP, and/or mobile phone records), Human Resource Information Systems (HRIS) including payroll and employment history records, time keeping systems, network and/or computer activity logs, GPS data, accounting data such as invoices, social media and/or other types of data sources. At block 604, process 600 selects columns for the universal format for each of the data sources. In one embodiment, for each data source, process 600 can select one, some, or all of the columns for transformation to the universal format. In this embodiment, which columns are selected for which data sources can be configured by an administrator. Process 600 transforms each data source at block 606. In one embodiment, process 600 transforms each data source by expanding the number of columns into a set of rows that can less than or equal to the number of columns from the original source. For example and in one embodiment, the transformation of each selected column is as described above.

At block 608, process 600 can optionally enrich the data in the universal format. In one embodiment, missing data in the universal format can be estimated from other data that is relevant to the missing data. For example and in one embodiment, if an email received record does not have location at time T, but there is a GPS location record at a time near T for the same person, process 600 can estimate that the location for the email received record is near the GPS location in the GPS location record. In addition, process 600 can compute a confidence value of how good the estimation is (e.g., a percent confidence, where a larger number means a higher confidence). In one embodiment, enrichment of a data record can result in filling in missing data elements, or by replacing previously enriched data elements with new data rated with a greater confidence level. In this embodiment, enrichment occurs by a number of logical and statistical methods including deductive, inductive, or abductive logic, and by matching related records using deterministic, probabilistic, stochastic, behavioral, or other methods. For example and in one embodiment, enrichment can be dependent upon geographic proximity (e.g., where two events within 1", 1', 10', 100' or some other distance of each other), gender proximity (e.g., where two people have the same gender), network connectivity proximity (e.g., were two devices within 1, 2 or 3 nodes of each other in a private and/or public network), degrees of human relatedness (e.g., were two people within 4 (or some other number) family relationship of each other [son-father-grandfather-uncle], or within 4 (or some other number) degrees of each other [boy-friend-friend-girl]), degrees of record relatedness (are these two records within one record ID of each other), temporal proximity (where two events within 1, 5, 10, or 15 minutes of each other, or 1 hour, 1 day, 1 week or 1 month, etc.).

In such circumstances and embodiment, mathematical rules and/or relationships (e.g. equal, average, interpolation, extrapolation, and/or other types of mathematical rules and/or relationships) can be used to assign the core element value being enriched, and hard coded, or dynamically determined (e.g. probabilistic) rules can be applied to assign a confidence level to the relatedness. For example and in one embodiment, according to the way a rule is set up, if two events related to the same person occur within 1 minute of each other, then the location L1, from one event E1, may be assigned to E2 with a confidence of 90%. If the events are 10 minutes apart, the confidence level assigned may be 75%. In both circumstances this may be impacted by examining other correlations before and after E1 and E2 whereby it may be determined that (a) the person was already likely moving at a high rate of speed, or (b) the person was likely not moving at all (i.e. behavioral analysis).

In a further embodiment, there can also be compound, cascading determinations of confidence levels.

For example and in one embodiment, two people who have the exact same first and last name may be determined to be the same person, and that sameness may have a confidence level, c1. Therefore, records associated with one may be used to enrich records associated with the other. If one record is enriched by having a location l1 added, at a calculated confidence level of c2, then the eventual assigned confidence level may be c1×c2, or a variation thereof.

In another embodiment, an important aspect of enrichment is tracking the confidence level when enriching data so that (a) a future analysis can take the confidence level into account and (b) a future enrichment opportunity can take the confidence level into account. In addition, there can be an audit, log, or record append entry which allows inspection (directly or indirectly) of the prior value (if any) and the method by which the new value and confidence level was derived. For example and in one embodiment, data enrichment can include grouping events to create another event. In this example, grouping a series of events that do not have more than a 5-minute gap between any occurrence, can equal a new enriched event called "Working". A further example of the scenario is a negative of the series of events, known as "Personal Activity" (e.g., not working).

Process 600 selects the rules for the analysis of block 610. In one embodiment, the rules can be queries that are used to match existing records in the universal format to determine properties, characteristics, and/or trends of the data stored in the universal format. At block 612, process 600 applies the rules to the universal formatted data. Process 600 retrieves and processes the matching data at block 614.

Figure 7:
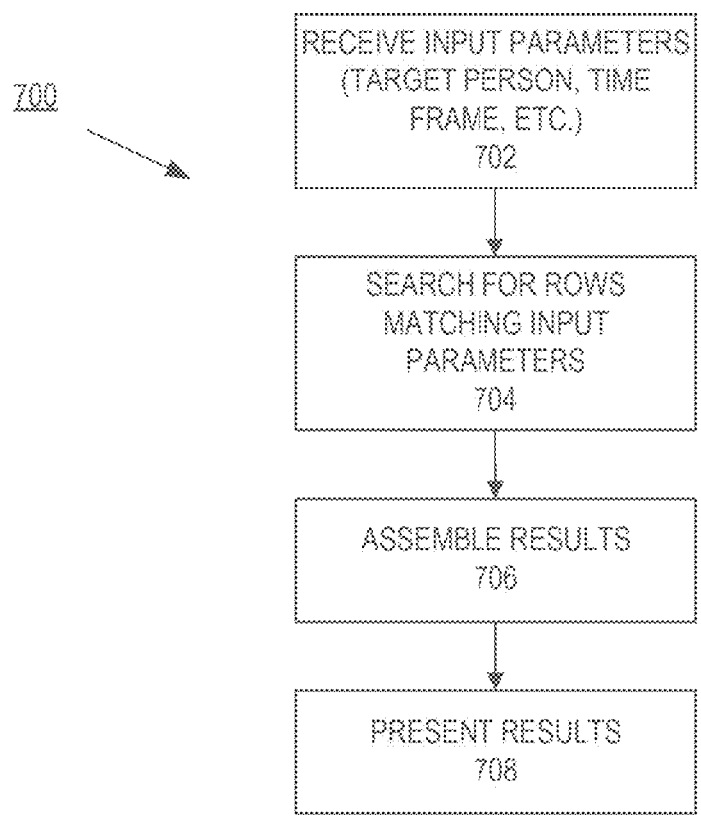
FIG. 7 is a flow diagram of one embodiment of a process to generate a "day in the life" timeline.

As described above, one type of analysis is a "day in the life" timeline for one or more people, where the "day in the life" timeline illustrates a set of one or more events associated with the one or more people. While in one embodiment, a "day of the life" timeline is associated with one or more events for one or more people, in alternate embodiments, a "day in the life" timeline can be for another type of object (e.g., vehicle, package, badge or another type of user credentials, and/or another type of object that is stored in the universal format). FIG. 7 is a flow diagram of one embodiment of a process 700 to generate a "day in the life" timeline. In FIG. 7, process 700 begins by receiving the input parameters for a "day in the life" timeline. In one embodiment, the input parameters can be a target person(s) (or another object(s)), timeframe, geolocation fence, result output parameters, and/or any other parameters used for the timeline generation. In one embodiment, the target person(s) can be one or more people that are the focus of the "day in the life" timeline. In addition, the timeframe can be an interval of time in which the timeline will cover. For example and in one embodiment, the timeline can be an hour, a day, week, and/or any other type of timeframe. In one embodiment, a geolocation fence can restrict the "day in the life" timeline to be within a certain geo-location. Furthermore, the result output parameters can be parameters that are used to characterize how the results would be formatted and/or presented. For example in one embodiment, the "day in the life" timeline can be presented as a chart, Gantt chart, bubble chart, overlaid on a map (e.g., a static or animated map), and/or another type of presentation. In a further example, the "day in the life" timeline can be one row, per source and/or event grouping.

Figure 8:
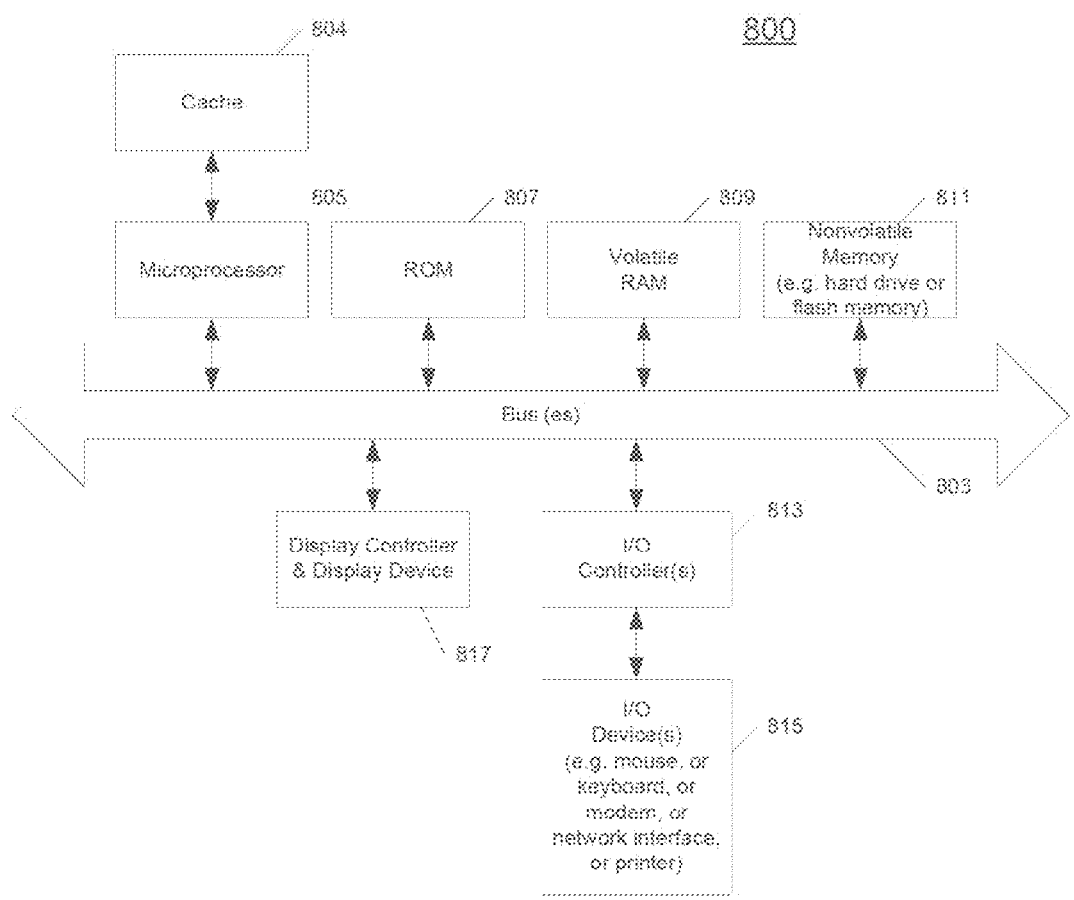
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including a data and analysis system 114 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network data received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random-access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "performing," "generating," "determining," "selecting," "expanding," "adding," "combining," "migrating," "enriching," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a location path for an object over a time period, the method comprising:
    receiving data from the plurality of data sources, wherein the plurality of data sources has different data formats;
    transforming the plurality of data sources into a universal data format;
    identifying an object in at least one of the plurality of data sources; and
    determining a location path for the object, wherein the location path includes a plurality of locations for the object over the time period, wherein each of the plurality of locations has a corresponding timestamp and the plurality of locations are derived from different ones of the plurality of data sources.

2. The non-transitory machine-readable medium of claim 1, wherein the plurality of locations is of different location types.

3. The non-transitory machine-readable medium of claim 2, wherein the different location types comprise at least one of a physical location, a social media location, a badge swipe location, or a cyber location.

4. The non-transitory machine-readable medium of claim 1, wherein at least one of the plurality of locations can be inferred from other data in one or more of the data sources.

5. The non-transitory machine-readable medium of claim 1, wherein at least one of the plurality of locations is measured.

6. The non-transitory machine-readable medium of claim 1, wherein each of the plurality of data sources are independently selected from the group consisting of badge swipe data, electronic communication records, phone records, Human Resource Information Systems data, global positioning system (GPS) data, invoice delivery data, social media, and enterprise resource planning data.

7. The non-transitory machine-readable medium of claim 1, wherein the method further comprises enriching the transformed data, wherein the enriching adds data to a field of a record that is missing data.

8. The non-transitory machine-readable medium of claim 7, wherein the enrichment of the transformed data further includes associating a confidence level to the added data.

9. The non-transitory machine-readable medium of claim 1, wherein the method further comprises:
    adding a new data source to the plurality of data sources; and
    transforming the new data source to the universal data format.

10. The non-transitory machine-readable medium of claim 1, wherein the location path is within a geolocation fence.

11. A method comprising:
    receiving data from a plurality of data sources, wherein the plurality of data sources has different data formats;
    transforming the plurality of data sources into a universal data format;
    identifying an object in at least one of the plurality of data sources; and determining a location path for the object, wherein the location path includes a plurality of locations for the object over the time period, wherein each of the plurality of locations has a corresponding timestamp and the plurality of locations are derived from different ones of the plurality of data sources.

12. The method of claim 11, wherein the plurality of locations is of different location types.

13. The method of claim 12, wherein the different location types are at least one of a physical location, a social media location, a badge swipe location, or a cyber location.

14. The method of claim 11, wherein at least one of the plurality of locations can be inferred from other data in one or more of the data sources.

15. The method of claim 11, wherein at least one of the plurality of locations is measured.

16. The method of claim 11, wherein each of the plurality of data sources are independently selected from the group consisting of badge swipe data, electronic communication records, phone records, Human Resource Information Systems data, global positioning system (GPS) data, invoice delivery data, social media, and enterprise resource planning data.

17. The method of claim 11, further comprising enriching the transformed data, wherein the enriching adds data to a field for a record that is missing data.

18. The method of claim 17, wherein enriching the transformed data further includes associating a confidence level with the added data.

19. The method of claim 11, further comprising:
adding a new data source to the plurality of data sources; and
transforming the new data source to the universal data format.

20. The method of claim 11, wherein the location path is within a geolocation fence.

* * * * *